US 7,599,718 B2
Oct. 6, 2009

(12) United States Patent
Kim

(54) HYBRID MOBILE COMMUNICATION TERMINAL AND METHOD OF ACQUIRING SYSTEM FOR DATA SERVICE IN HYBRID MOBILE COMMUNICATION TERMINAL

(75) Inventor: Jong-yeob Kim, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 618 days.

(21) Appl. No.: 11/302,580

(22) Filed: Dec. 13, 2005

(65) Prior Publication Data

US 2006/0203755 A1    Sep. 14, 2006

(30) Foreign Application Priority Data

Mar. 9, 2005    (KR) ...................... 10-2005-0019705

(51) Int. Cl.
    *H04B 1/38* (2006.01)
(52) U.S. Cl. .................. 455/574; 455/103; 455/552.1; 455/553.1; 370/311
(58) Field of Classification Search ............. 455/552.1, 455/553.1, 103, 435.2, 448, 574; 370/311
See application file for complete search history.

(56) References Cited

U.S. PATENT DOCUMENTS

2005/0047398 A1* 3/2005 Yeom ......................... 370/352

FOREIGN PATENT DOCUMENTS

KR    2002-0086245    11/2002
KR    2004059686 A * 7/2004

* cited by examiner

*Primary Examiner*—Raymond S Dean
(74) *Attorney, Agent, or Firm*—H.C. Park & Associates, PLC

(57) ABSTRACT

Disclosed are a hybrid mobile communication terminal and a method of acquiring a system for data service in the hybrid terminal. The hybrid terminal includes a mode setting unit which sets an HDR power save mode and an indicator indicating the HDR power save mode when data service cannot be provided through the EVDO system; and a data communication unit which attempts to acquire the 1x system or the EVDO system according to whether the indicator has been set by the mode setting unit. The method includes: setting an HDR power save mode and an indicator indicating the HDR power save mode when the data service cannot be provided through the EVDO system; determining whether the indicator has been set upon acquiring a system for the data service; and attempting to acquire the 1x system or the EVDO system according to whether the indicator has been set.

12 Claims, 3 Drawing Sheets

HYBRID MOBILE COMMUNICATION TERMINAL AND METHOD OF ACQUIRING SYSTEM FOR DATA SERVICE IN HYBRID MOBILE COMMUNICATION TERMINAL

BACKGROUND OF THE INVENTION

This application claims the priority of Korean Patent Application No. 2005-19705, filed on Mar. 9, 2005, in the Korean Intellectual Property Office, the disclosure of which is incorporated herein in its entirety by reference.

1. Field of the Invention

The present invention relates to a mobile communication terminal and, more particularly, to a hybrid mobile communication terminal that supports packet data service of high data rate of up to 2.547 Mbps in a Code Division Multiple Access (CDMA) cell site in addition to supporting IS-95A/B/C voice and data services.

2. Description of Related Art

CDMA2000 is a $3^{rd}$ Generation (3G) mobile telecommunications standard that uses CDMA, a multiple access scheme for digital radio, to send voice, data, and signaling data (such as a dialed telephone number) between mobile communication terminals and cell sites. CDMA2000 1x (hereinafter also referred to as "1x_Only") is the core 3G CDMA2000 technology, and supports up to 144 kbps packet data speeds. Meanwhile, CDMA2000 1xEV (Evolution) is CDMA2000 1x with High Data Rate (HDR) capability added. CDMA2000 1x EVDO (Evolution Data Only) (hereinafter referred to as "EVDO"), a phase of CDMA2000 1xEV, supports downlink (Forward Link) data rates up to 3.1 Mbps and uplink (Reverse Link) rates up to 1.8 Mbps in a radio channel dedicated to carrying high speed packet data.

IS-856 for EVDO is a protocol different from Interim Standard 2000 (IS-2000) protocol for 1x_Only, and requires an additional base station unit (channel card) for EVDO independently of a base station unit for 1x_Only. FIG. 1 illustrates an IS-2000 radio network supporting 1x and a 1xEV radio network supporting EVDO, which are provided separately from each other. A physical layer of EVDO (IS-856) is different from that of 1x. EVDO services can be currently offered by adding devices supporting EVDO to an existing 1x_Only system.

A hybrid mobile communication terminal is a device which can access both EVDO and 1x_Only systems for packet data services. When the hybrid mobile communication terminal (hereinafter referred to as "hybrid terminal") is powered on, it receives an overhead message over a paging channel of a 1x system and acquires the 1x system. Subsequently, the hybrid terminal receives a pilot signal over a pilot channel of an EVDO system and acquires the EVDO system. The hybrid terminal operates in a slotted mode depicted in FIG. 2 both for the 1x and EVDO systems. That is, the hybrid terminal is in a hybrid operating mode.

If the hybrid terminal is powered on in a blanket area in which EVDO services are not provided, it first acquires a 1x system and then attempts to acquire an EVDO system. However, since the hybrid terminal cannot acquire the EVDO system in the blanket area, it stops attempting to acquire the EVDO system according to the slot period of FIG. 2. That is, the hybrid terminal is set to an HDR power save mode. As a result, the hybrid terminal operates in a 1x_Only operating mode in which it can acquire only the 1x system.

In addition, when moving to the blanket area in the hybrid operating mode, the hybrid terminal cannot acquire the EVDO system and stops attempting to acquire the EVDO system according to the slot period. In this case, the hybrid terminal is set to the HDR power save mode so that it stops attempting to acquire the EVDO system according to the slot period.

However, if a user requests data services through the hybrid terminal in the HDR power save mode, the hybrid terminal first attempts to acquire the EVDO system. In this case, if the hybrid terminal fails to acquire the EVDO system, it reattempts to acquire the 1x system. That is, when the hybrid terminal acquires a system for data services in the HDR power save mode, the hybrid terminal attempts to acquire the EVDO system and then reattempts to acquire the 1x system, causing a delay in a data call connection.

SUMMARY OF THE INVENTION

The present invention provides a hybrid mobile communication terminal capable of preventing data call connection delay in an HDR power save mode.

According to an aspect of the present invention, there is provided a method of acquiring a system for data service in a hybrid mobile communication terminal that can acquire a 1x system supporting voice and low-speed data services and an EVDO (Evolution Data Only) system supporting a high-speed data service, the method including the operations of: setting an HDR (High Data Rate) power save mode and an indicator indicating the HDR power save mode when the data service cannot be provided through the EVDO system; determining whether the indicator has been set or not upon acquiring a system for a data service at the request of a user; and attempting to acquire the 1x system or the EVDO system according to whether the indicator has been set or not.

The method may further include the operations of: attempting to acquire the EVDO system at regular intervals if the HDR power save mode is set; and releasing the HDR power save mode and the indicator after the EVDO system has been acquired.

According to another aspect of the present invention, there is provided a hybrid mobile communication terminal that can acquire a 1x system supporting voice and low-speed data services and an EVDO system supporting a high-speed data service, including: a mode setting unit which sets an HDR power save mode and an indicator indicating the HDR power save mode when a data service cannot be provided through the EVDO system; and a data communication unit which, upon attempting to acquire a system for a data service at the request of a user, attempts to acquire the 1x system or the EVDO system according to whether the indicator has been set or not by the mode setting unit.

The HDR power slot mode may prevent attempting to acquire the EVDO system according to slot period.

The data communication unit may attempt to acquire the 1x system when the indicator has been set by the mode setting unit, or the data communication unit may attempt to acquire the EVDO system when the indicator has not been set.

The data communication unit may attempt to acquire the EVDO system at regular intervals if the HDR power save mode is set by the mode setting unit, and the mode setting unit may release the HDR power save mode and the indicator after the EVDO system has been acquired by the data communication unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 3:
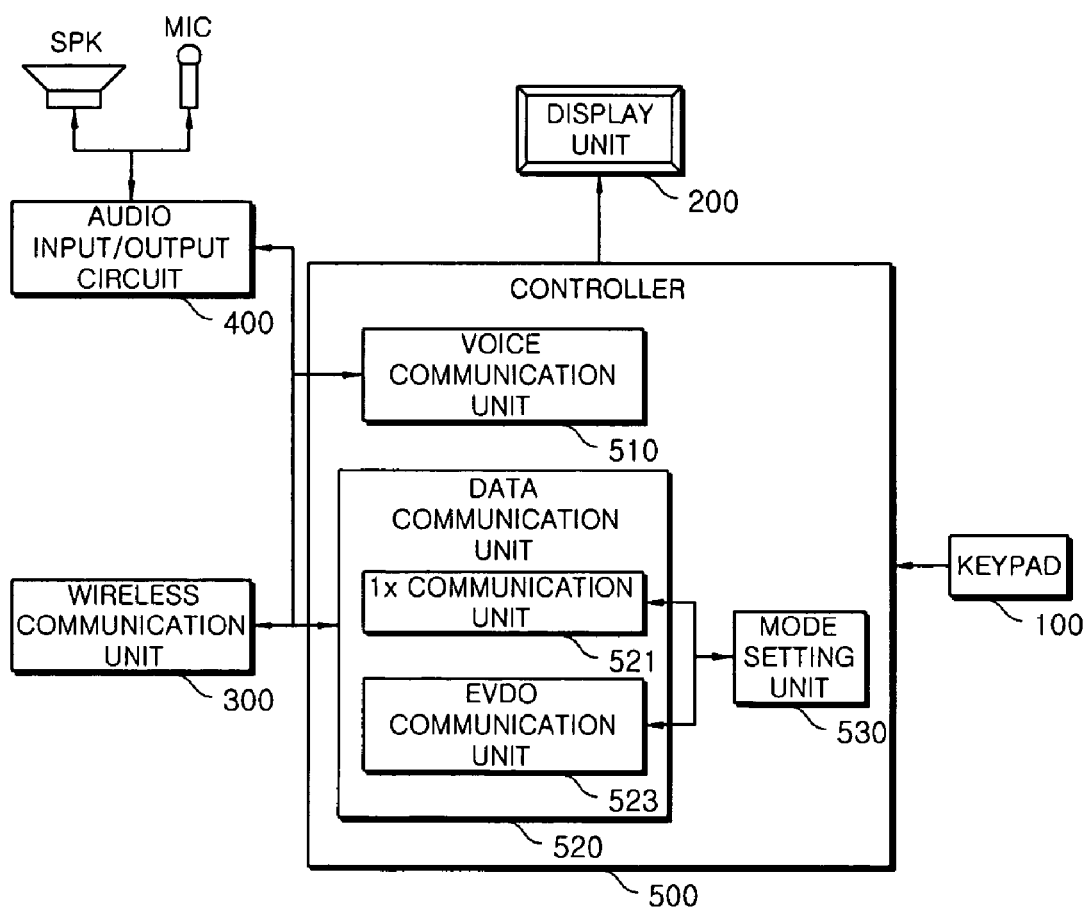
FIG. 3 is a block diagram of a hybrid terminal in accordance with an embodiment of the present invention.

FIG. 3 is a block diagram of a hybrid terminal in accordance with an embodiment of the present invention. The hybrid terminal includes a keypad 100, a display unit 200, a wireless communication unit 300, an audio input/output circuit 400, and a controller 500. The display unit 200 allows a user to monitor operation of the hybrid terminal. An example of the display unit 200 is a liquid crystal display (LCD) device. The wireless communication unit 300 includes an antenna and a radio frequency (RF) circuit to communicate with base stations and extracts voice and data signals from radio signals transmitted/received via the antenna. The audio input/output circuit 400 inputs and outputs voice signals received from the wireless communication unit 300 through a microphone and a speaker. In addition, the audio input/output circuit 400 converts digital audio data into analog audio signals or vice versa, and includes an audio amplifier, a filter and the like. A baseband circuit of the wireless communication unit 300 and most circuits constituting the controller 500 are integrated into a commercially available single integrated circuit. The integrated circuit, typically called an MSM (Mobile Station Modem), includes hardware dedicated for communication, a digital signal processor, and a general-purpose microprocessor. Individual components constituting the controller 500 may be provided in a hardware form, a software form, or a combination of both of them.

The controller 500 includes a voice communication unit 510 processing voice communications and a data communication unit 520 processing data communications. The data communication unit 520 includes a 1x communication unit 521 communicating with a 1x system supporting voice and low-speed data services, and an EVDO communication unit 523 communicating with an EVDO system supporting high-speed data services. The controller 500 further includes a mode setting unit 530.

When data services cannot be provided through the EVDO system, the mode setting unit 530 sets an HDR power save mode and additionally sets an indicator indicating the HDR power save mode.

When a hybrid terminal is powered on in a blanket area or moves to a blanket area in which there is no required wireless resource available for the EVDO system, data services cannot be provided through the EVDO system since the hybrid terminal cannot acquire the EVDO system.

In addition, when a data call connection is denied by an EVDO system, data services cannot be provided through the EVDO system. In more detail, when a user attempts to access the wireless Internet, the EVDO communication unit 523 of the hybrid terminal attempts to acquire an EVDO system. After acquiring the EVDO system, the EVDO communication unit 523 transmits a message for a data call connection. At this time, the EVDO system may transmit a connection-deny message for some reasons. That is, an access of the hybrid terminal to the EVDO system is denied due to a connection-deny instruction from the EVDO system. In this case, the hybrid terminal blocks a channel to the access-denied EVDO system for a predetermined time interval (e.g., Avoid 420 sec) so that the EVDO system cannot be acquired. The hybrid terminal sequentially retrieves channels indicated in a Preferred Roaming List (PRL) to acquire another EVDO system. However, if there are no wireless resources for other EVDO channels in a cell at which the hybrid terminal is located, the hybrid terminal cannot acquire the EVDO system. Consequently, the hybrid terminal has acquired the EVDO system but cannot make a data call connection since the EVDO system has denied the data call connection. Accordingly, data services cannot be provided through the EVDO system.

Further, when a hybrid terminal is located at a weak electric field area or cannot receive a response from an EVDO system so that a data call connection is not made, data services cannot be provided through the EVDO system. When a user attempts to access the wireless Internet, the EVDO communication unit 523 of the hybrid terminal attempts to acquire an EVDO system. After acquiring the EVDO system, the hybrid terminal transmits a signal for data call connection to the EVDO system. In the weak electric field area, since the signal transmitted from the hybrid terminal cannot be transmitted to the EVDO system, the hybrid terminal cannot receive a response signal from the EVDO system. In addition, although the hybrid terminal transmits the signal to the acquired EVDO system, the EVDO system may not receive the signal due to a fault in the EVDO system.

When a hybrid terminal transmits a signal to an EVDO system several times but cannot receive a response signal from the EVDO system, the hybrid terminal blocks a channel to the EVDO system for a predetermined time interval (e.g., Avoid 60 sec). The hybrid terminal sequentially retrieves channels indicated in the PRL to acquire another EVDO system. However, if there are no wireless resources for other EVDO channels in a cell at which the hybrid terminal is located, the hybrid terminal cannot acquire the EVDO system. Consequently, since the hybrid terminal has acquired the EVDO system but cannot transmit a signal to the EVDO system due to weak electric field or cannot receive a response signal from the EVDO system, data services cannot be provided through the EVDO system.

Figure 1:
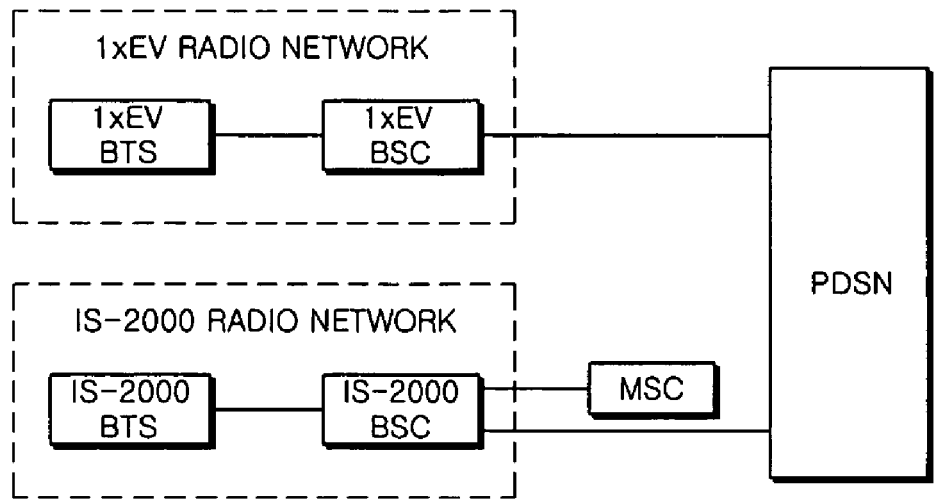
FIG. 1 is a block diagram of a mobile communication network supporting a hybrid operation mode of a hybrid terminal.
Figure 2:
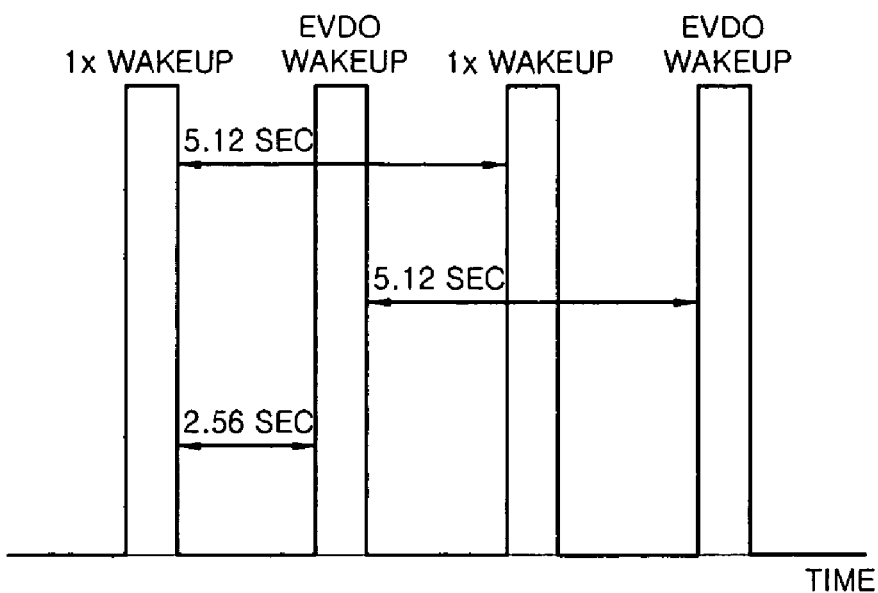
FIG. 2 is a monitoring period in a hybrid operating mode of a hybrid terminal.

As described above, when data services cannot be provided through the EVDO system, the mode setting unit 530 sets an HDR power save mode and also sets an indicator indicating the HDR power save mode. The indicator is preferably a flag bit. When data services cannot be provided through the EVDO system, the flag bit is set to "1" by the mode setting unit 530. In the HDR power save mode, the hybrid terminal stops attempting to acquire the EVDO system according to the slot period shown in FIG. 2, thereby avoiding unnecessary battery consumption.

When a user attempts to access the wireless Internet through the keypad 100, the data communication unit 520 checks whether or not a flag bit is set to "1". If the flag bit is set to "1", the 1x communication unit 521 of the data communication unit 520 attempts to acquire a 1x system supporting low-speed data services. After acquiring the 1x system, the 1x communication unit 521 makes a data call connection to support low-speed data services.

If the flag bit is not set to "1", the EVDO communication unit 523 of the data communication unit 520 attempts to acquire the EVDO system supporting high-speed data services. That is, the hybrid terminal first attempts to acquire the EVDO system. After acquiring the EVDO system, the EVDO communication unit 523 makes a data call connection to support high-speed data services.

That is, according to the present embodiment, when a user requests data services under the condition in which data services cannot be provided through the EVDO system, the hybrid terminal first makes a data call connection to the 1x system. Accordingly, it is possible to prevent delay of a data call connection. Conventionally, when data services are requested from a hybrid terminal which is set to the HDR power save mode, it takes a total of about 3~4 seconds from the time when the hybrid terminal attempts to acquire the EVDO system to the time when the hybrid terminal acquires the 1x system and attempts to make a data call connection. However, according to an embodiment of the present invention, when data services are requested from the hybrid terminal which is set to the HDR power save mode, it takes about 100 ms from the time when the hybrid terminal acquires the 1x system to the time when the hybrid terminal attempts to make a data call connection, resulting in a significant improvement of access speed.

In another embodiment of the present invention, the EVDO communication unit 523 of the data communication unit 520 attempts to acquire an EVDO system at regular intervals when the HDR power save mode is set by the mode setting unit 530. That is, the hybrid terminal attempts to acquire the EVDO system in the HDR power save mode at regular intervals (e.g., 2, 4, 8, 16 seconds, ...) regardless of the slot period.

When the EVDO communication unit 523 of the data communication unit 520 attempts to acquire the EVDO system at regular intervals rather than at the slot period so that it acquires an EVDO system of another channel before the predetermined time (Avoid time) is expired, or acquires an EVDO system of the channel or an EVDO system of another channel after the predetermined time (Avoid time) is expired, the mode setting unit 530 releases the HDR power save mode and the indicator indicating the HDR power save mode. The mode setting unit 530 preferably sets the indicator, i.e., the flag bit, from "1" to "0". Accordingly, the hybrid terminal operates in a hybrid operating mode.

Accordingly, when the data service through the EVDO system is made possible, the hybrid terminal can acquire the EVDO system supporting a high-speed data service when a user requires the data service.

Figure 4:
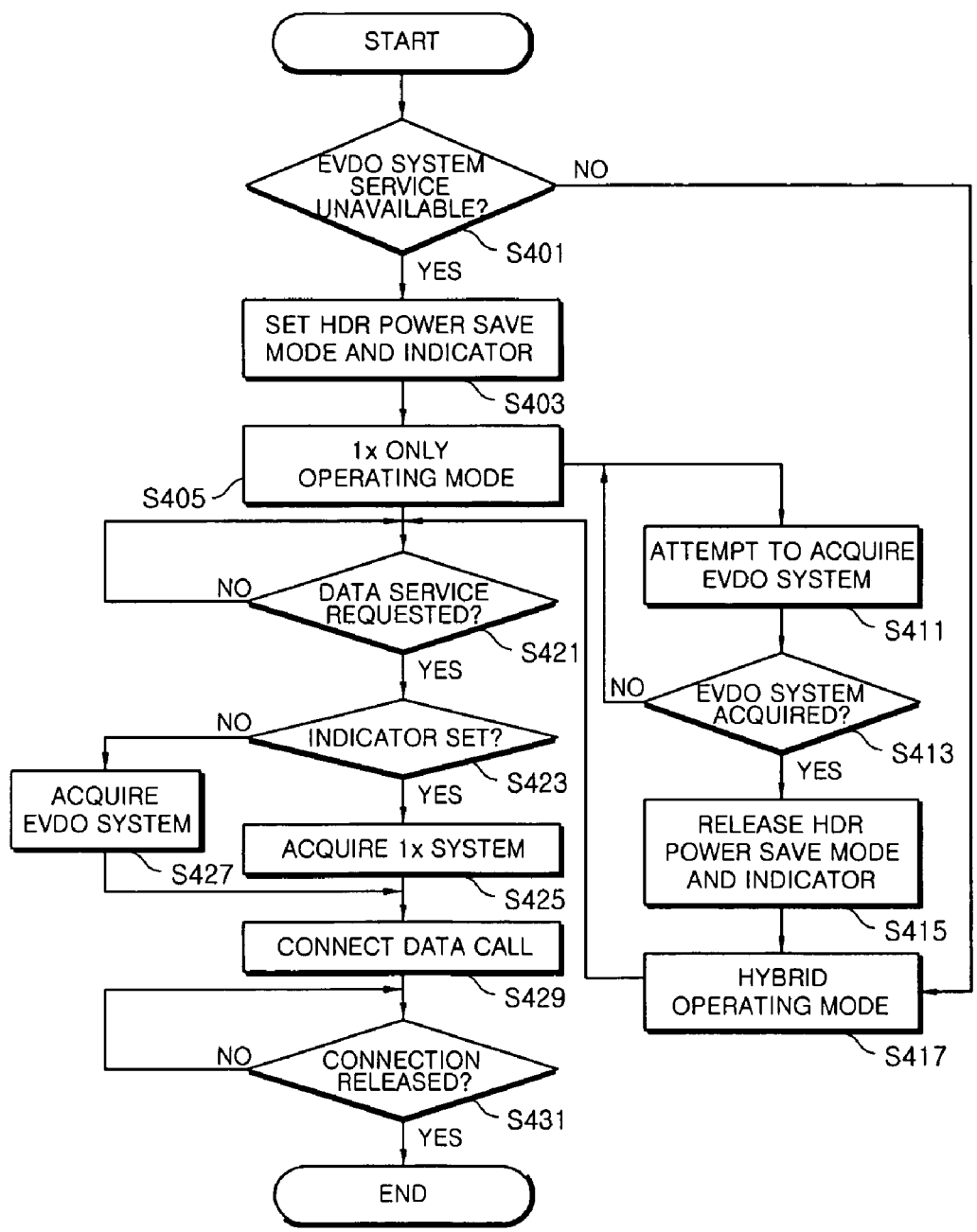
FIG. 4 is a flow chart of a data call connection process in a hybrid terminal in accordance with another embodiment of the present invention.

FIG. 4 is a flow chart of a data call connection process of a hybrid terminal according to another embodiment of the present invention. First, the controller 500 determines whether or not data service can be provided through an EVDO system (operation S401). If the data service can be provided through the EVDO system, the hybrid terminal operates in a hybrid operating mode (operation S417). If the data service can not be provided through the EVDO system, the mode setting unit 530 sets an HDR power save mode and sets a flag bit, i.e., an indicator indicating the HDR power save mode, to "1" (operation S403). Accordingly, the hybrid terminal operates in a 1x_Only operating mode (operation S405).

In the 1x_Only operating mode, the EVDO communication unit 523 of the data communication unit 520 periodically attempts to acquire the EVDO system (operation S411). If the EVDO system is acquired in S411 (operation S413), the mode setting unit 530 releases the HDR power save mode and resets the flag bit to "0" (operation S415). Accordingly, the hybrid terminal operates in a hybrid operating mode (operation S417).

When a user presses a wireless Internet access key in the keypad 100, the controller 500 checks whether or not the flag bit is set to "1" (operations S421 and S423). If the flag bit is set to "1", the 1x communication unit 521 of the data communication unit 520 attempts to acquire the 1x system (operation S425). If the flag bit is set to "0", the EVDO communication unit 523 of the data communication unit 520 attempts to acquire the EVDO system (operation S427). The EVDO communication unit 523 may not acquire the EVDO system. In this case, the EVDO communication unit 523 acquires the 1x system, and sets an HDR power save mode and an indicator indicating the HDR power save mode.

If the 1x system or the EVDO system is acquired, the controller 500 performs a data call connection process to provide data service to a user (operation S429). If the user requests a data call disconnection, the controller 500 disconnects the data call (operation S431).

As apparent from the above description, when data service cannot be provided through the EVDO system, the hybrid terminal according to the present invention acquires the 1x system when a user requests the data service. Accordingly, it is possible to prevent data call connection delay. Conventionally, it takes about 3~4 seconds from the time when the hybrid terminal attempts to acquire an EVDO system in the HDR power save mode to the time when the hybrid terminal acquires the 1x system and attempts to make a data call connection. However, according to the present invention, it takes about 100 milliseconds from the time when the hybrid terminal acquires the 1x system to the time when the hybrid terminal attempts to make a data call connection, resulting in a significant improvement of access speed.

In addition, when the data service through the EVDO system is made possible, the hybrid terminal can acquire the EVDO system supporting a high-speed data service when a user requires the data service.

While the present invention has been described with reference to exemplary embodiments thereof, it will be understood by those skilled in the art that various changes in form and details may be made therein without departing from the scope of the present invention as defined by the following claims.

What is claimed is:

1. A method of acquiring a system for data service in a hybrid mobile communication terminal that can acquire a 1x system supporting voice and low-speed data services and an EVDO (Evolution Data Only) system supporting a high-speed data service, the method comprising the operations of:

setting an HDR (High Data Rate) power save mode and an indicator indicating the HDR power save mode if the data service cannot be provided through the EVDO system;

determining whether the indicator has been set upon receiving a request from a user for a data service; and attempting to acquire the 1x system or the EVDO system according to whether the indicator has been set.

2. The method of claim 1, wherein the HDR power save mode prevents attempting to acquire the EVDO system according to slot period.

3. The method of claim 2, wherein the hybrid mobile communication terminal attempts to acquire the 1x system if the indicator has been set, and attempts to acquire the EVDO system if the indicator has not been set.

4. The method of claim 1, further comprising the operations of:

attempting to acquire the EVDO system at regular intervals if the HDR power save mode is set; and releasing the HDR power save mode and the indicator after the EVDO system has been acquired.

5. The method of claim 2, further comprising the operations of:

attempting to acquire the EVDO system at regular intervals if the HDR power save mode is set; and releasing the HDR power save mode and the indicator after the EVDO system has been acquired.

6. The method of claim 3, further comprising the operations of:

attempting to acquire the EVDO system at regular intervals if the HDR power save mode is set; and releasing the HDR power save mode and the indicator after the EVDO system has been acquired.

7. A hybrid mobile communication terminal that can acquire a 1x system supporting voice and low-speed data services and an EVDO (Evolution Data Only) system supporting a high-speed data service, comprising:

a mode setting unit to set an HDR (High Data Rate) power save mode and an indicator indicating the HDR power save mode if a data service cannot be provided through the EVDO system; and a data communication unit to acquire the 1x system or the EVDO system according to whether the indicator has been set by the mode setting unit.

8. The hybrid mobile communication terminal of claim 7, wherein the HDR power save mode prevents attempting to acquire the EVDO system according to slot period.

9. The hybrid mobile communication terminal of claim 8, wherein the data communication unit attempts to acquire the 1x system if the indicator has been set by the mode setting unit, and attempts to acquire the EVDO system if the indicator has not been set.

10. The hybrid mobile communication terminal of claim 7, wherein the data communication unit attempts to acquire the EVDO system at regular intervals if the HDR power save mode is set by the mode setting unit, and the mode setting unit releases the HDR power save mode and the indicator after the EVDO system has been acquired by the data communication unit.

11. The hybrid mobile communication terminal of claim 8, wherein the data communication unit attempts to acquire the EVDO system at regular intervals if the HDR power save mode is set by the mode setting unit, and the mode setting unit releases the HDR power save mode and the indicator after the EVDO system has been acquired by the data communication unit.

12. The hybrid mobile communication terminal of claim 9, wherein the data communication unit attempts to acquire the EVDO system at regular intervals if the HDR power save mode is set by the mode setting unit, and the mode setting unit releases the HDR power save mode and the indicator after the EVDO system has been acquired by the data communication unit.

* * * * *

UNITED STATES PATENT AND TRADEMARK OFFICE
CERTIFICATE OF CORRECTION

PATENT NO. : 7,599,718 B2  Page 1 of 1
APPLICATION NO. : 11/302580
DATED : October 6, 2009
INVENTOR(S) : Jong-yeob Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Twenty-eighth Day of September, 2010

David J. Kappos
*Director of the United States Patent and Trademark Office*